US010749821B2

(12) United States Patent
Pulugurtha et al.

(10) Patent No.: US 10,749,821 B2
(45) Date of Patent: Aug. 18, 2020

(54) DOMAIN-SPECIFIC CONNECTED TYPE AHEAD FOR CHAT

(71) Applicant: Cisco Technology, Inc., San Jose, CA (US)

(72) Inventors: Srinivasa Subramanyam Pulugurtha, Nashua, NH (US); Thomas Weissinger, Hopkinton, MA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 165 days.

(21) Appl. No.: 16/005,125

(22) Filed: Jun. 11, 2018

(65) Prior Publication Data

US 2019/0379616 A1 Dec. 12, 2019

(51) Int. Cl.
*H04L 12/58* (2006.01)
*H04L 29/06* (2006.01)

(52) U.S. Cl.
CPC .......... *H04L 51/02* (2013.01); *H04L 65/1069* (2013.01); *H04L 65/403* (2013.01)

(58) Field of Classification Search
CPC ......... H04L 51/32; H04L 51/02; H04L 51/10; H04L 65/403; H04L 65/1069; G06F 16/9535; G06F 16/24575
USPC ....................................................... 709/206
See application file for complete search history.

(56) References Cited

U.S. PATENT DOCUMENTS

| | | | |
|---|---|---|---|
| 8,626,509 B2 | 1/2014 | Roy et al. | |
| 9,501,745 B2* | 11/2016 | Nitz | H04L 51/02 |
| 9,661,067 B2 | 5/2017 | Seth et al. | |
| 9,715,496 B1 | 7/2017 | Sapoznik et al. | |
| 9,996,524 B1* | 6/2018 | Hwang | G06F 3/013 |
| 10,250,541 B2* | 4/2019 | Beach | H04L 51/16 |
| 2017/0011303 A1* | 1/2017 | Annapureddy | G06N 7/005 |
| 2017/0351962 A1* | 12/2017 | Appel | G06N 7/005 |
| 2018/0239770 A1* | 8/2018 | Ghotbi | G06F 3/0484 |
| 2018/0336200 A1* | 11/2018 | Lim | G06F 16/335 |
| 2019/0171728 A1* | 6/2019 | Wakankar | G06N 5/046 |

OTHER PUBLICATIONS

Harry Guinness, "How to Start a Group Chat in WhatsApp," Nov. 2016, howtogeek.com, www.howtogeek.com/282196/how-to-start-a-group-chat-in-whatsapp/ (Year: 2016).*

(Continued)

*Primary Examiner* — Ruolei Zong

(74) *Attorney, Agent, or Firm* — Polsinelli PC

(57) ABSTRACT

Systems, methods, and computer-readable media for providing domain-specific type-ahead suggestions in a chat. In some embodiments, a method can include connecting a first user to communicate with a second user in a chat session. A first user-specific type-ahead domain for the second user can be selected based on one or more characteristics associated with the first user. The method can include receiving message input from the second user in the first chat session and selecting a first user-specific type-ahead suggestion for the second user based on the message input and the one or more characteristics associated with the first user using the first user-specific type-ahead domain. Subsequently, the first user-specific type-ahead suggestion can be presented to the first user if the second user accepts the first user-specific type-ahead suggestion.

20 Claims, 10 Drawing Sheets

(56) References Cited

OTHER PUBLICATIONS

"Multiple chat threads within a single window," IBM, Ip.Com Disclosure No. IPCOM00031378D, Sep. 22, 2004, pp. 1-2.
"Chat," https://www.eptica.com/node/2383, page accessed on Mar. 7, 2018, pp. 1-4.

* cited by examiner

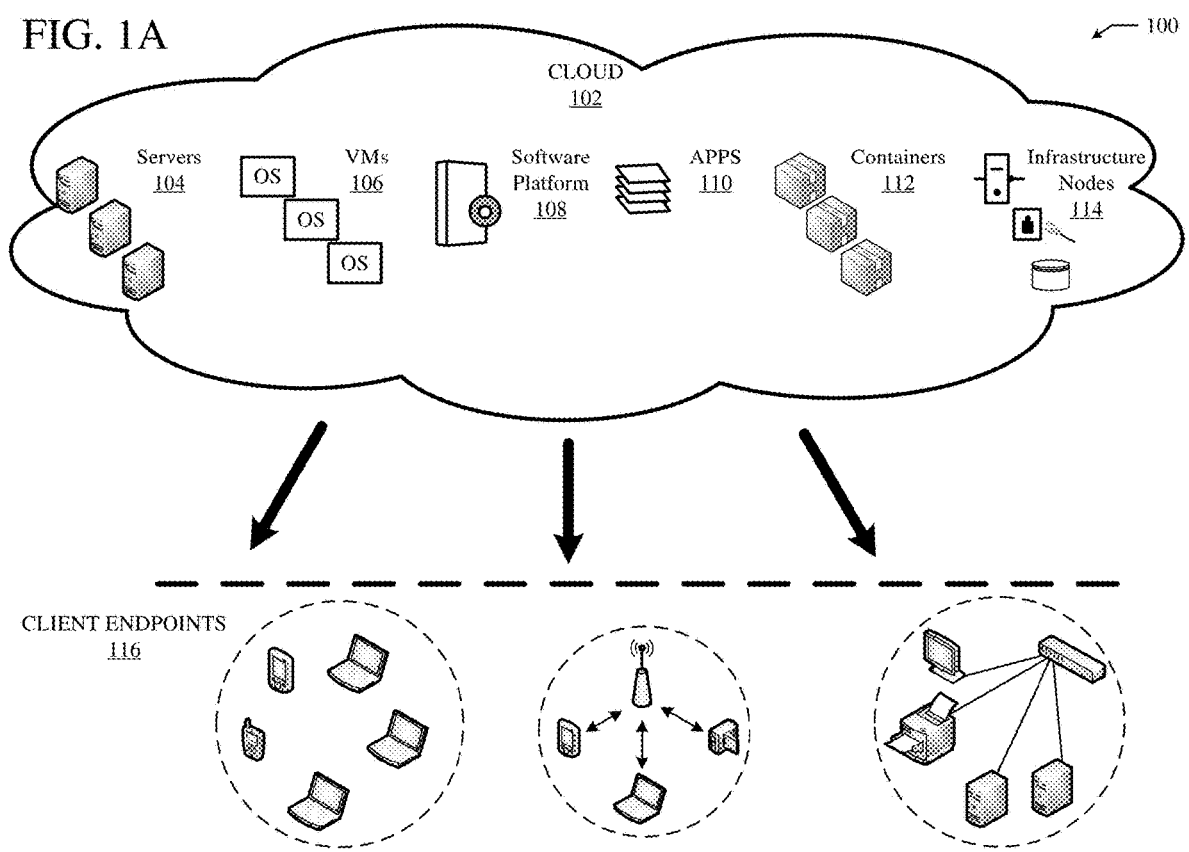

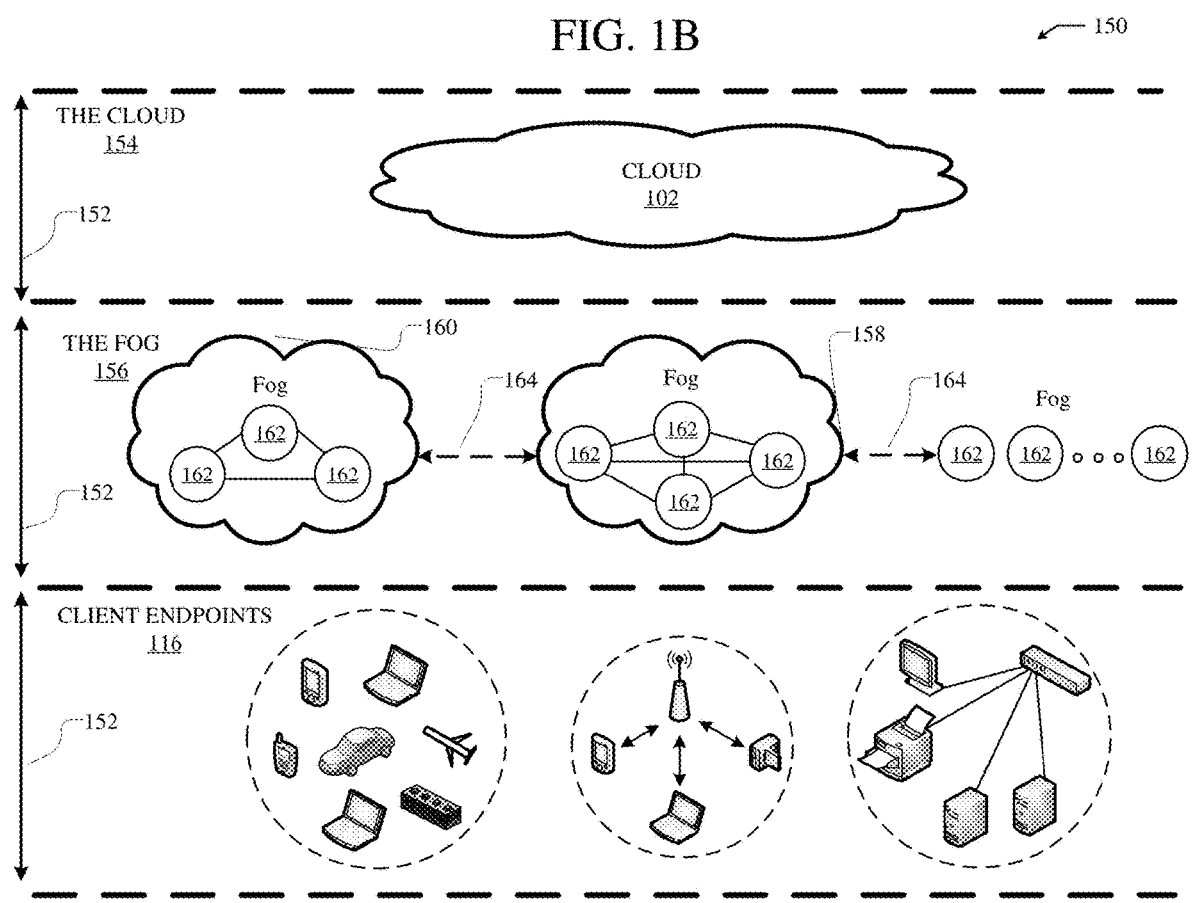

DOMAIN-SPECIFIC CONNECTED TYPE AHEAD FOR CHAT

TECHNICAL FIELD

The present technology pertains to type-ahead suggesting for users in a chat session, and in particular to providing type-ahead suggestions for users in a chat session using a type-ahead domain selected based on one or more characteristics of a user in the chat session.

BACKGROUND

Currently, chat sessions are used by people to communicate. Additionally, currently, type-ahead mechanisms for suggesting words, phrases, or otherwise completed messages exist in various fields. In particular type-ahead mechanisms can be utilized to allow people to more efficiently and quickly communicate, as they no longer need to input completed words and messages in order to produce a completed word or message. These fields are typically limited to text suggesting in SMS messaging platforms and text suggesting in search engines and have not been widely adapted in active chat session implementations. There therefore exist needs for extending type-ahead suggestions within active chat sessions.

Further, often times type-ahead suggestion methods use generic type-ahead domains to make type-ahead suggestions. This can often lead to presentation of incorrect type-ahead suggestions or otherwise irrelevant type-ahead suggestions to users. There therefore exist needs for selecting type-ahead domains that are not generic to users, e.g. type-ahead domains that are specific to the users, and can be used to determine relevant and accurate type-ahead suggestions for the users. These needs further extend into the fields of chat where more accurate and relevant type-ahead suggestions, e.g. using domains that are not generic to users, can further facilitate quick and efficient communication between the users in a chat.

Further, often times chat sessions are used by companies to provide services to customers. For example, customer service representatives (herein referred to as "CSRs") can chat with customers through chat sessions to answer questions and provide other services. CSRs can have difficulty in addressing needs of a customer in a chat session. Further, often times CSRs have to chat with multiple customers concurrently in different chat sessions. This can place burdens on a CSR in trying to remember conversations and contexts associated with conversations and customers in order to provide service to the customers through different chat sessions occurring simultaneously. There therefore exist needs for platforms and methods that allow a CSR to more easily chat with a customer in a chat session. Additionally, needs exist for platforms and methods that can allow a CSR to communicate with different customers concurrently in different chat sessions.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 1A illustrates an example cloud computing architecture;

FIG. 1B illustrates an example fog computing architecture;

DESCRIPTION OF EXAMPLE EMBODIMENTS

Figure 2A:
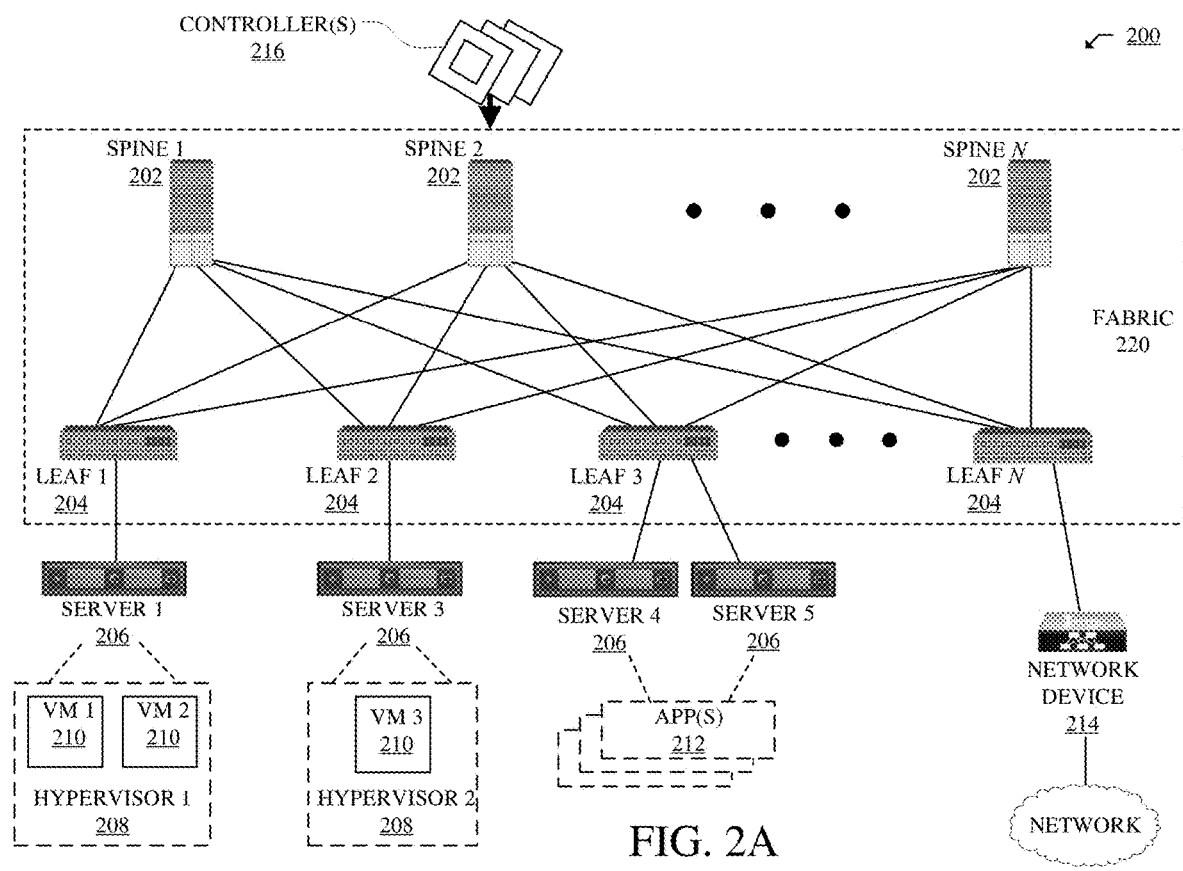
FIG. 2A illustrates a schematic diagram of an example network architecture.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

A method can include connecting a first user to communicate with a second user in a first chat session. The method can include selecting a first user-specific type-ahead domain for the second user based on one or more characteristics associated with the first user. Message input can be received from the second user in the first chat session. Subsequently, the method can include selecting a first user-specific type-ahead suggestion for the second user in response to receipt of the message input based on both the message input and the one or more characteristics associated with the first user using the first user-specific type-ahead domain selected based on the one or more characteristics associated with the first user. Subsequently, the method can include presenting the first user-specific type-ahead suggestion to the first user through the first chat session if the second user accepts the first user-specific type ahead suggestion.

A system can connect a first user to communicate with a second user in a first chat session. A first user-specific type-ahead domain for the second user can be selected based on a context associated with the first user. The system can receive second user message input from the second user in the first chat session. Additionally, the system can select a first user-specific type-ahead suggestion for the second user in response to receipt of the second user message input from the second user in the first chat session. The system can select the first user-specific type-ahead suggestion for the second user based on both the second user message input and the context associated with the first user using the first user-specific type-ahead domain selected based on the context associated with the first user. Further, the system can present the first user-specific type ahead suggestion to the first user through the first chat session if the second user accepts the user-specific type-ahead suggestion.

A system can connect a first entity to communicate with a second entity in a first chat session. A first entity-specific type-ahead domain for the second entity can be selected based on one or more characteristics associated with the first entity as indicated by first entity message input from the first entity to the second entity in the first chat session. The system can further receive second entity message input from the second entity in the first chat session. A first entity-specific type-ahead suggestion can be selected for the second entity in response to receipt of the second entity message input from the second entity in the first chat session. The system can select the first entity-specific type-ahead suggestion based on the second entity message input and the one or more characteristics associated with the first entity using the first entity-specific type-ahead domain selected based on the one or more characteristics associated with the first entity. Further, the system can present the first entity-specific type ahead suggestion to the first entity through the first chat session if the second entity accepts the entity-specific type-ahead suggestion.

Description

The disclosed technology addresses the need in the art for providing relevant and accurate type-ahead suggestions to users in a chat session. The present technology involves system, methods, and computer-readable media for providing relevant and accurate type-ahead suggestions to users in a chat session through type-ahead domains selected based on one or more characteristics of one or more users in the chat session.

Figure 7:
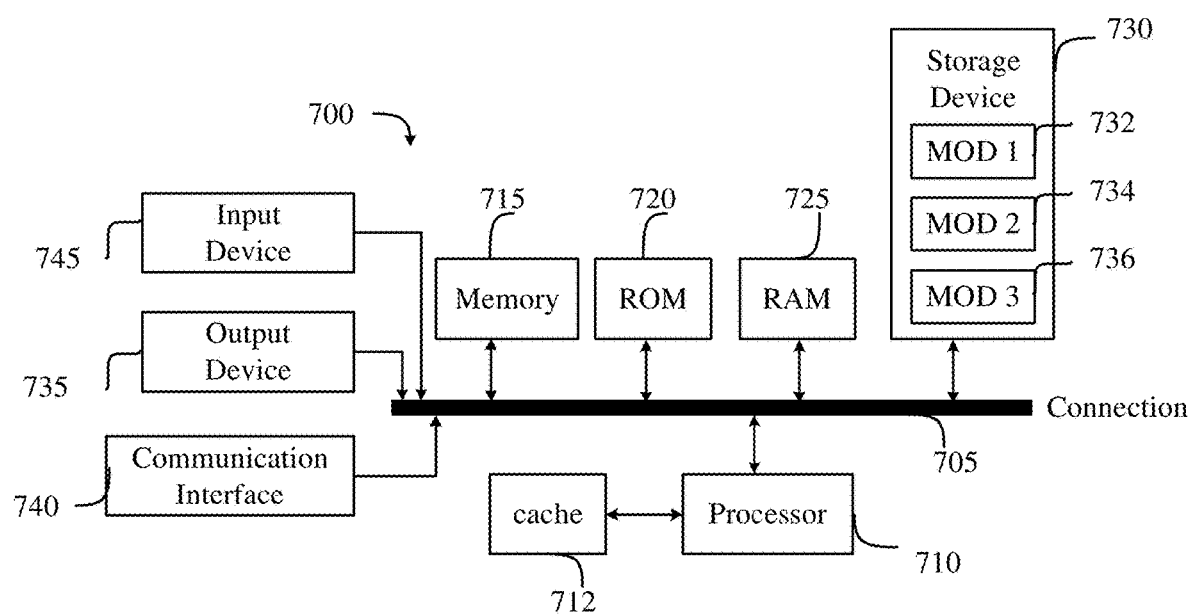
FIG. 7 illustrates an example computing system.
Figure 8:
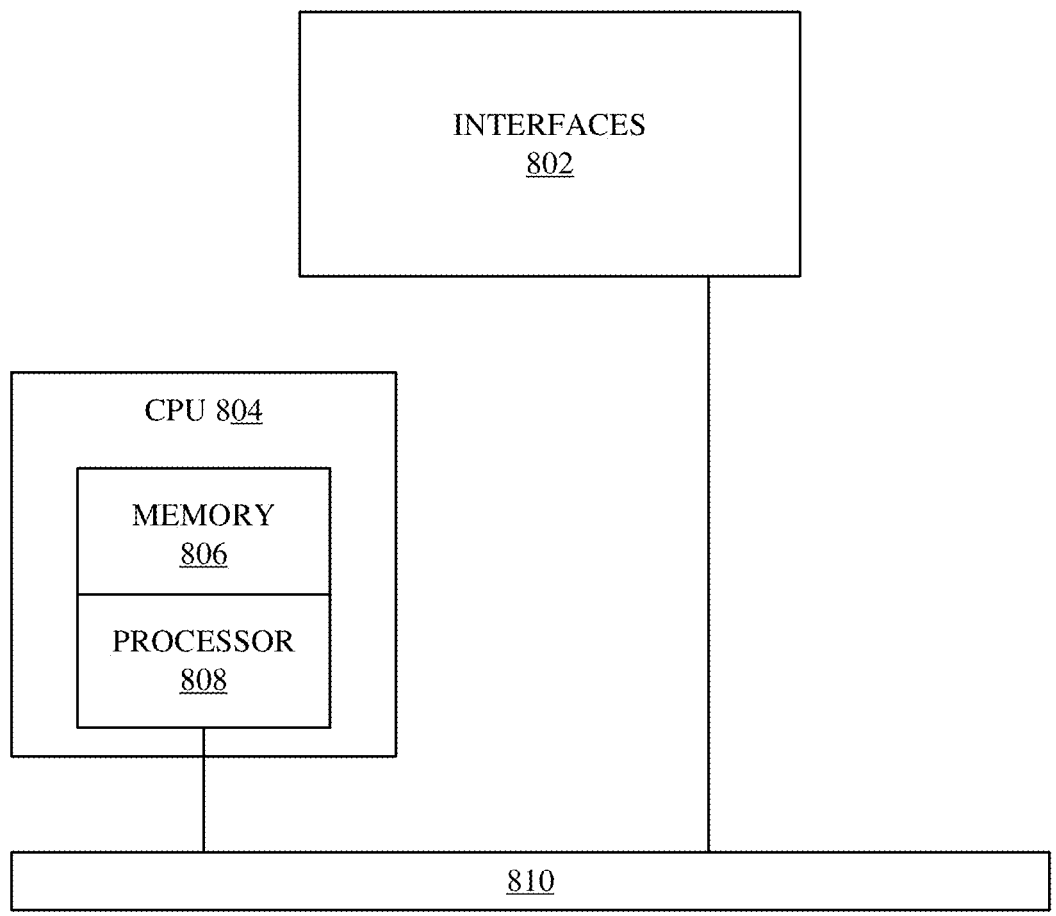
FIG. 8 illustrates an example network device.

A description of network environments and architectures for network data access and services including network environments and architectures for providing chat platforms, as illustrated in FIGS. 1A, 1B, 2A, and 2B, is first disclosed herein. A discussion of systems and methods for chat communication though type-ahead suggesting, as shown in FIGS. 3, 4, 5, and 6, will then follow. The discussion then concludes with a brief description of example devices, as illustrated in FIGS. 7 and 8. These variations shall be described herein as the various embodiments are set forth. The disclosure now turns to FIG. 1A.

FIG. 1A illustrates a diagram of an example cloud computing architecture 100. The architecture can include a cloud 102. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can provide various cloud computing services via the cloud elements 104-114, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

FIG. 1B illustrates a diagram of an example fog computing architecture 150. The fog computing architecture 150 can include the cloud layer 154, which includes the cloud 102 and any other cloud system or environment, and the fog layer 156, which includes fog nodes 162. The client endpoints 116 can communicate with the cloud layer 154 and/or the fog layer 156. The architecture 150 can include one or more communication links 152 between the cloud layer 154, the fog layer 156, and the client endpoints 116. Communications can flow up to the cloud layer 154 and/or down to the client endpoints 116.

The fog layer 156 or "the fog" provides the computation, storage and networking capabilities of traditional cloud networks, but closer to the endpoints. The fog can thus extend the cloud 102 to be closer to the client endpoints 116. The fog nodes 162 can be the physical implementation of fog networks. Moreover, the fog nodes 162 can provide local or regional services and/or connectivity to the client endpoints 116. As a result, traffic and/or data can be offloaded from the cloud 102 to the fog layer 156 (e.g., via fog nodes 162). The fog layer 156 can thus provide faster services and/or connectivity to the client endpoints 116, with lower latency, as well as other advantages such as security benefits from keeping the data inside the local or regional network(s).

The fog nodes 162 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 162 can be deployed within fog instances 158, 160. The fog instances 158, 160 can be local or regional clouds or networks. For example, the fog instances 158, 160 can be a regional cloud or data center, a local area network, a network of fog nodes 162, etc. In some configurations, one or more fog nodes 162 can be deployed within a network, or as standalone or individual nodes, for example. Moreover, one or more of the fog nodes 162 can be interconnected with each other via links 164 in various topologies, including star, ring, mesh or hierarchical arrangements, for example.

In some cases, one or more fog nodes 162 can be mobile fog nodes. The mobile fog nodes can move to different geographic locations, logical locations or networks, and/or fog instances while maintaining connectivity with the cloud layer 154 and/or the endpoints 116. For example, a particular fog node can be placed in a vehicle, such as an aircraft or train, which can travel from one geographic location and/or logical location to a different geographic location and/or logical location. In this example, the particular fog node may connect to a particular physical and/or logical connection point with the cloud 154 while located at the starting location and switch to a different physical and/or logical connection point with the cloud 154 while located at the destination location. The particular fog node can thus move within particular clouds and/or fog instances and, therefore, serve endpoints from different locations at different times.

FIG. 2A illustrates a diagram of an example Network Environment 200, such as a data center. In some cases, the Network Environment 200 can include a data center, which can support and/or host the cloud 102. The Network Environment 200 can include a Fabric 220 which can represent the physical layer or infrastructure (e.g., underlay) of the Network Environment 200. Fabric 220 can include Spines 202 (e.g., spine routers or switches) and Leafs 204 (e.g., leaf routers or switches) which can be interconnected for routing or switching traffic in the Fabric 220. Spines 202 can interconnect Leafs 204 in the Fabric 220, and Leafs 204 can connect the Fabric 220 to an overlay or logical portion of the Network Environment 200, which can include application services, servers, virtual machines, containers, endpoints, etc. Thus, network connectivity in the Fabric 220 can flow from Spines 202 to Leafs 204, and vice versa. The interconnections between Leafs 204 and Spines 202 can be redundant (e.g., multiple interconnections) to avoid a failure in routing. In some embodiments, Leafs 204 and Spines 202 can be fully connected, such that any given Leaf is connected to each of the Spines 202, and any given Spine is connected to each of the Leafs 204. Leafs 204 can be, for example, top-of-rack ("ToR") switches, aggregation switches, gateways, ingress and/or egress switches, provider edge devices, and/or any other type of routing or switching device.

Leafs 204 can be responsible for routing and/or bridging tenant or customer packets and applying network policies or rules. Network policies and rules can be driven by one or more Controllers 216, and/or implemented or enforced by one or more devices, such as Leafs 204. Leafs 204 can connect other elements to the Fabric 220. For example, Leafs 204 can connect Servers 206, Hypervisors 208, Virtual Machines (VMs) 210, Applications 212, Network Device 214, etc., with Fabric 220. Such elements can reside in one or more logical or virtual layers or networks, such as an overlay network. In some cases, Leafs 204 can encapsulate and de-encapsulate packets to and from such elements (e.g., Servers 206) in order to enable communications throughout Network Environment 200 and Fabric 220. Leafs 204 can also provide any other devices, services, tenants, or workloads with access to Fabric 220. In some cases, Servers 206 connected to Leafs 204 can similarly encapsulate and de-encapsulate packets to and from Leafs 204. For example, Servers 206 can include one or more virtual switches or routers or tunnel endpoints for tunneling packets between an overlay or logical layer hosted by, or connected to, Servers 206 and an underlay layer represented by Fabric 220 and accessed via Leafs 204.

Applications 212 can include software applications, services, containers, appliances, functions, service chains, etc. For example, Applications 212 can include a firewall, a database, a CDN server, an IDS/IPS, a deep packet inspection service, a message router, a virtual switch, etc. An application from Applications 212 can be distributed, chained, or hosted by multiple endpoints (e.g., Servers 206, VMs 210, etc.), or may run or execute entirely from a single endpoint.

VMs 210 can be virtual machines hosted by Hypervisors 208 or virtual machine managers running on Servers 206. VMs 210 can include workloads running on a guest operating system on a respective server. Hypervisors 208 can provide a layer of software, firmware, and/or hardware that creates, manages, and/or runs the VMs 210. Hypervisors 208 can allow VMs 210 to share hardware resources on Servers 206, and the hardware resources on Servers 206 to appear as multiple, separate hardware platforms. Moreover, Hypervisors 208 on Servers 206 can host one or more VMs 210.

In some cases, VMs 210 and/or Hypervisors 208 can be migrated to other Servers 206. Servers 206 can similarly be migrated to other locations in Network Environment 200.

For example, a server connected to a specific leaf can be changed to connect to a different or additional leaf. Such configuration or deployment changes can involve modifications to settings, configurations and policies that are applied to the resources being migrated as well as other network components.

In some cases, one or more Servers 206, Hypervisors 208, and/or VMs 210 can represent or reside in a tenant or customer space. Tenant space can include workloads, services, applications, devices, networks, and/or resources that are associated with one or more clients or subscribers. Accordingly, traffic in Network Environment 200 can be routed based on specific tenant policies, spaces, agreements, configurations, etc. Moreover, addressing can vary between one or more tenants. In some configurations, tenant spaces can be divided into logical segments and/or networks and separated from logical segments and/or networks associated with other tenants. Addressing, policy, security and configuration information between tenants can be managed by Controllers 216, Servers 206, Leafs 204, etc.

Configurations in Network Environment 200 can be implemented at a logical level, a hardware level (e.g., physical), and/or both. For example, configurations can be implemented at a logical and/or hardware level based on endpoint or resource attributes, such as endpoint types and/or application groups or profiles, through a software-defined network (SDN) framework (e.g., Application-Centric Infrastructure (ACI) or VMWARE NSX). To illustrate, one or more administrators can define configurations at a logical level (e.g., application or software level) through Controllers 216, which can implement or propagate such configurations through Network Environment 200. In some examples, Controllers 216 can be Application Policy Infrastructure Controllers (APICs) in an ACI framework. In other examples, Controllers 216 can be one or more management components for associated with other SDN solutions, such as NSX Managers.

Such configurations can define rules, policies, priorities, protocols, attributes, objects, etc., for routing and/or classifying traffic in Network Environment 100. For example, such configurations can define attributes and objects for classifying and processing traffic based on Endpoint Groups (EPGs), Security Groups (SGs), VM types, bridge domains (BDs), virtual routing and forwarding instances (VRFs), tenants, priorities, firewall rules, etc. Other example network objects and configurations are further described below. Traffic policies and rules can be enforced based on tags, attributes, or other characteristics of the traffic, such as protocols associated with the traffic, EPGs associated with the traffic, SGs associated with the traffic, network address information associated with the traffic, etc. Such policies and rules can be enforced by one or more elements in Network Environment 200, such as Leafs 204, Servers 206, Hypervisors 208, Controllers 216, etc. As previously explained, Network Environment 200 can be configured according to one or more particular software-defined network (SDN) solutions, such as CISCO ACI or VMWARE NSX. These example SDN solutions are briefly described below.

ACI can provide an application-centric or policy-based solution through scalable distributed enforcement. ACI supports integration of physical and virtual environments under a declarative configuration model for networks, servers, services, security, requirements, etc. For example, the ACI framework implements EPGs, which can include a collection of endpoints or applications that share common configuration requirements, such as security, QoS, services, etc. Endpoints can be virtual/logical or physical devices, such as VMs, containers, hosts, or physical servers that are connected to Network Environment 200. Endpoints can have one or more attributes such as a VM name, guest OS name, a security tag, application profile, etc. Application configurations can be applied between EPGs, instead of endpoints directly, in the form of contracts. Leafs 204 can classify incoming traffic into different EPGs. The classification can be based on, for example, a network segment identifier such as a VLAN ID, VXLAN Network Identifier (VNID), NVGRE Virtual Subnet Identifier (VSID), MAC address, IP address, etc.

In some cases, classification in the ACI infrastructure can be implemented by Application Virtual Switches (AVS), which can run on a host, such as a server or switch. For example, an AVS can classify traffic based on specified attributes, and tag packets of different attribute EPGs with different identifiers, such as network segment identifiers (e.g., VLAN ID). Finally, Leafs 204 can tie packets with their attribute EPGs based on their identifiers and enforce policies, which can be implemented and/or managed by one or more Controllers 216. Leaf 204 can classify to which EPG the traffic from a host belongs and enforce policies accordingly.

Another example SDN solution is based on VMWARE NSX. With VMWARE NSX, hosts can run a distributed firewall (DFW) which can classify and process traffic. Consider a case where three types of VMs, namely, application, database and web VMs, are put into a single layer-2 network segment. Traffic protection can be provided within the network segment based on the VM type. For example, HTTP traffic can be allowed among web VMs, and disallowed between a web VM and an application or database VM. To classify traffic and implement policies, VMWARE NSX can implement security groups, which can be used to group the specific VMs (e.g., web VMs, application VMs, database VMs). DFW rules can be configured to implement policies for the specific security groups. To illustrate, in the context of the previous example, DFW rules can be configured to block HTTP traffic between web, application, and database security groups.

Returning now to FIG. 2A, Network Environment 200 can deploy different hosts via Leafs 204, Servers 206, Hypervisors 208, VMs 210, Applications 212, and Controllers 216, such as VMWARE ESXi hosts, WINDOWS HYPER-V hosts, bare metal physical hosts, etc. Network Environment 200 may interoperate with a variety of Hypervisors 208, Servers 206 (e.g., physical and/or virtual servers), SDN orchestration platforms, etc. Network Environment 200 may implement a declarative model to allow its integration with application design and holistic network policy.

Controllers 216 can provide centralized access to fabric information, application configuration, resource configuration, application-level configuration modeling for a software-defined network (SDN) infrastructure, integration with management systems or servers, etc. Controllers 216 can form a control plane that interfaces with an application plane via northbound APIs and a data plane via southbound APIs.

As previously noted, Controllers 216 can define and manage application-level model(s) for configurations in Network Environment 200. In some cases, application or device configurations can also be managed and/or defined by other components in the network. For example, a hypervisor or virtual appliance, such as a VM or container, can run a server or management tool to manage software and services in Network Environment 200, including configurations and settings for virtual appliances.

As illustrated above, Network Environment 200 can include one or more different types of SDN solutions, hosts, etc. For the sake of clarity and explanation purposes, various examples in the disclosure will be described with reference to an ACI framework, and Controllers 216 may be interchangeably referenced as controllers, APICs, or APIC controllers. However, it should be noted that the technologies and concepts herein are not limited to ACI solutions and may be implemented in other architectures and scenarios, including other SDN solutions as well as other types of networks which may not deploy an SDN solution.

Further, as referenced herein, the term "hosts" can refer to Servers 206 (e.g., physical or logical), Hypervisors 208, VMs 210, containers (e.g., Applications 212), etc., and can run or include any type of server or application solution. Non-limiting examples of "hosts" can include virtual switches or routers, such as distributed virtual switches (DVS), application virtual switches (AVS), vector packet processing (VPP) switches; VCENTER and NSX MANAGERS; bare metal physical hosts; HYPER-V hosts; VMs; DOCKER Containers; etc.

Figure 2B:
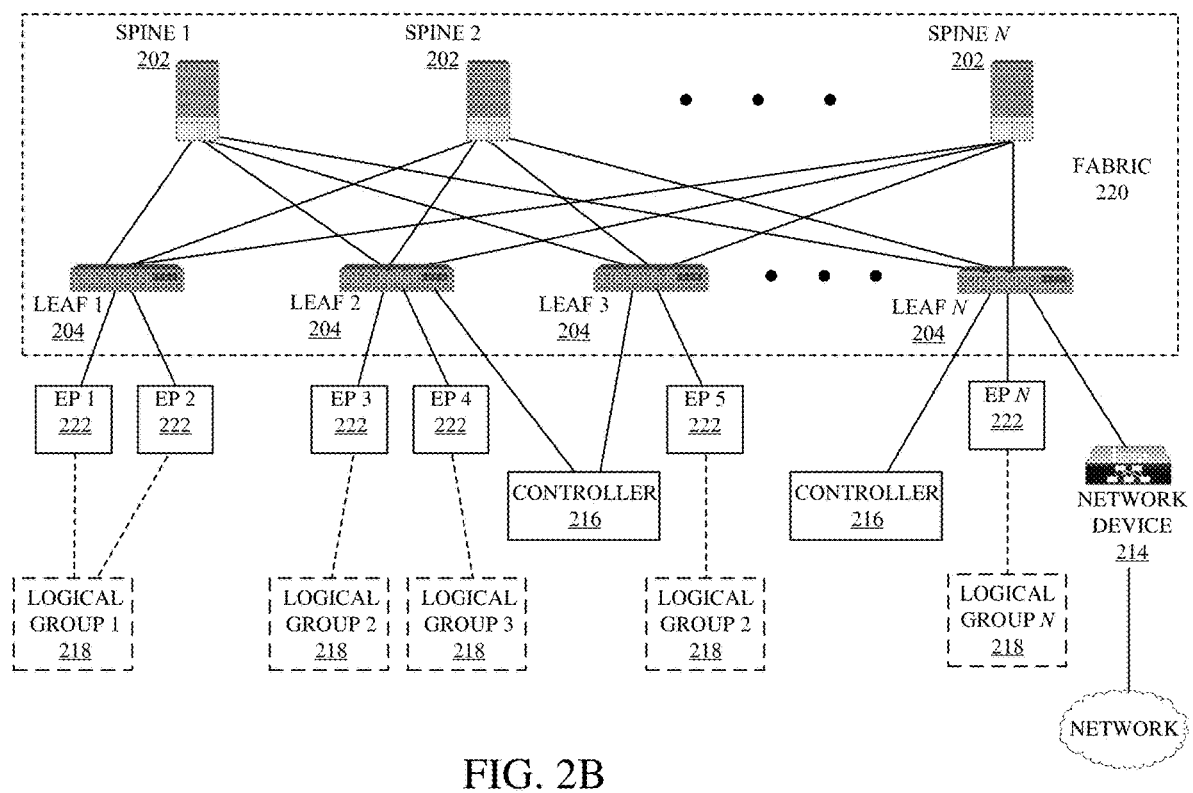
FIG. 2B illustrates a schematic diagram of another example network architecture.

FIG. 2B illustrates another example of Network Environment 200. In this example, Network Environment 200 includes Endpoints 222 connected to Leafs 204 in Fabric 220. Endpoints 222 can be physical and/or logical or virtual entities, such as servers, clients, VMs, hypervisors, software containers, applications, resources, network devices, workloads, etc. For example, an Endpoint 222 can be an object that represents a physical device (e.g., server, client, switch, etc.), an application (e.g., web application, database application, etc.), a logical or virtual resource (e.g., a virtual switch, a virtual service appliance, a virtualized network function (VNF), a VM, a service chain, etc.), a container running a software resource (e.g., an application, an appliance, a VNF, a service chain, etc.), storage, a workload or workload engine, etc. Endpoints 122 can have an address (e.g., an identity), a location (e.g., host, network segment, virtual routing and forwarding (VRF) instance, domain, etc.), one or more attributes (e.g., name, type, version, patch level, OS name, OS type, etc.), a tag (e.g., security tag), a profile, etc.

Endpoints 222 can be associated with respective Logical Groups 218. Logical Groups 218 can be logical entities containing endpoints (physical and/or logical or virtual) grouped together according to one or more attributes, such as endpoint type (e.g., VM type, workload type, application type, etc.), one or more requirements (e.g., policy requirements, security requirements, QoS requirements, customer requirements, resource requirements, etc.), a resource name (e.g., VM name, application name, etc.), a profile, platform or operating system (OS) characteristics (e.g., OS type or name including guest and/or host OS, etc.), an associated network or tenant, one or more policies, a tag, etc. For example, a logical group can be an object representing a collection of endpoints grouped together. To illustrate, Logical Group 1 can contain client endpoints, Logical Group 2 can contain web server endpoints, Logical Group 3 can contain application server endpoints, Logical Group N can contain database server endpoints, etc. In some examples, Logical Groups 218 are EPGs in an ACI environment and/or other logical groups (e.g., SGs) in another SDN environment.

Traffic to and/or from Endpoints 222 can be classified, processed, managed, etc., based Logical Groups 218. For example, Logical Groups 218 can be used to classify traffic to or from Endpoints 222, apply policies to traffic to or from Endpoints 222, define relationships between Endpoints 222, define roles of Endpoints 222 (e.g., whether an endpoint consumes or provides a service, etc.), apply rules to traffic to or from Endpoints 222, apply filters or access control lists (ACLs) to traffic to or from Endpoints 222, define communication paths for traffic to or from Endpoints 222, enforce requirements associated with Endpoints 222, implement security and other configurations associated with Endpoints 222, etc.

In an ACI environment, Logical Groups 218 can be EPGs used to define contracts in the ACI. Contracts can include rules specifying what and how communications between EPGs take place. For example, a contract can define what provides a service, what consumes a service, and what policy objects are related to that consumption relationship. A contract can include a policy that defines the communication path and all related elements of a communication or relationship between endpoints or EPGs. For example, a Web EPG can provide a service that a Client EPG consumes, and that consumption can be subject to a filter (ACL) and a service graph that includes one or more services, such as firewall inspection services and server load balancing.

Currently, chat sessions are used by people to communicate. Additionally, currently, type-ahead mechanisms for suggesting words, phrases, or otherwise completed messages exist in various fields. In particular type-ahead mechanisms can be utilized to allow people to more efficiently and quickly communicate, as they no longer need to input completed words and messages in order to produce a completed word or message. These fields are typically limited to text suggestion in SMS messaging platforms and text suggestion in search engines and have not been widely adapted in active chat session implementations. There therefore exist needs for extending type-ahead suggesting within active chat sessions.

In order to address this challenge, a chat platform is configured to provide type-ahead suggestions to users in a chat session and subsequently delivers messages between users based on the type-ahead suggestions. Specifically, a chat platform is provided that identifies and presents a type-ahead suggestion to a first user in a chat session. Subsequently, the chat platform can present the type-ahead suggestion to a second user in the chat session, e.g. upon acceptance of the type-ahead suggestion by the first user. Accordingly, a platform is provided that extends type-ahead suggesting to an active chat session.

Further, often times type-ahead suggestion methods use generic type-ahead domains to make type-ahead suggestions. This can often lead to presentation of incorrect type-ahead suggestions or otherwise irrelevant type-ahead suggestions to users. There therefore exist needs for selecting type-ahead domains that are not generic to users that can be used to determine relevant and accurate type-ahead suggestions for the users. These needs further extend into the fields of chat where more accurate and relevant type-ahead suggestions, e.g. using domains that are not generic to users, can further facilitate quick and efficient communication between the users in a chat.

In order to provide more accurate and relevant type-ahead suggestions to users, user-specific type-ahead domains can be utilized to provide type-ahead suggestions to users, e.g. in a chat session. More specifically, a type-ahead domain for users with specific characteristics can be selected and utilized to provide type-ahead suggestions to users in a chat session with a user that has one or more of the specific characteristics. For example, if a user is interested or talking about a specific topic, then a type-ahead domain for the specific topic can be utilized to provide type-ahead suggestions for the user in the chat session. In another example, the type-ahead domain for the specific topic can be utilized to provide type-ahead suggestions for another user in the chat session with the user. Accordingly, more efficient and faster communication can be facilitated, e.g. in a chat session. Specifically, by utilizing user-specific type-ahead domains, more accurate and relevant type-ahead suggestions can be provided, as opposed to if generic, e.g. non-user-specific type ahead domains, are utilized to provide the type-ahead suggestions.

Further, often times chat sessions are used by companies to provide services to customers. For example, CSRs can chat with customers through chat sessions to answer questions and provide other services. Often times, CSRs have difficulty in addressing needs of a customer in a chat session. Further, often times CSRs have to chat with multiple customers concurrently in different chat sessions. This can place burdens on a CSR in trying to remember conversations and contexts associated with conversations and customers in order to provide service to the customers through different chat sessions occurring simultaneously. There therefore exists needs for platforms and methods that allow a CSR to more easily chat with a customer in a chat session. Additionally, there exists needs for platforms and methods that allow a CSR to communicate with different customers concurrently in different chat sessions.

In order to facilitate easier communication between a CSR and a customer or multiple customers in a chat session, a chat platform is provided that provides type-ahead suggestions. Specifically, a chat platform can provide type-ahead suggestions to either or both a customer and a CSR in a chat session. More specifically, type-ahead suggestions can be provided through a chat platform to either or both a customer and a CSR in a chat session using one or more user-specific type-ahead domains. Utilizing type-ahead suggesting, e.g. through user-specific type-ahead domains, between a customer and a CSR in a chat session can facilitate easier communication between the customer and the CSR. Further facilitating easier communication between a customer and a CSR in a chat session, can promote easier communication between the CSR and different customers in multiple chat sessions concurrently. For example, as less effort is expended by a CSR to communicate with a customer in a chat session through type-ahead suggesting, the CSR can more easily communicate with multiple customers concurrently in different chat sessions.

Figure 3:
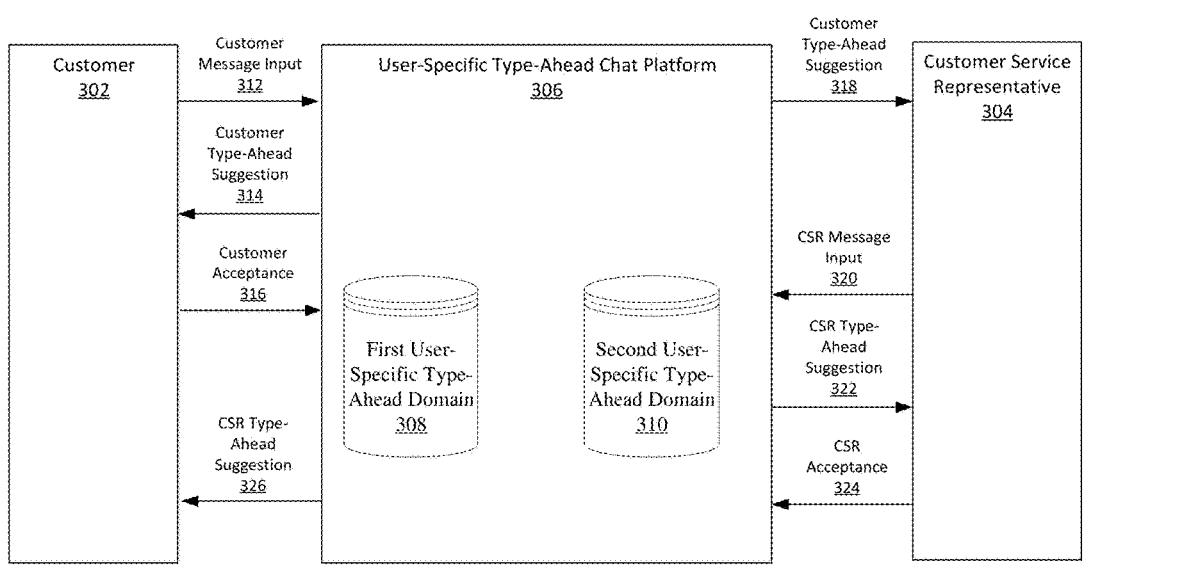
FIG. 3 depicts a chat environment for providing communications between a customer and a CSR using type-ahead suggestions in a chat session.

FIG. 3 depicts a chat environment 300 for providing communications between a customer and a CSR using type-ahead suggestions in a chat session. While the chat environment 300 shown in FIG. 3 and other applicable chat environments, systems, methods, and platforms described herein are discussed with reference to a customer and a CSR, in certain embodiments, the environments, systems, methods, and platforms described herein can be extended to users who are not in a customer and a CSR relationship. For example, an applicable chat platform described herein can provide type-ahead suggesting through user-specific type-ahead domains to friends who are chatting socially through the platform.

The chat environment 300 can be implemented, at least in part, through an applicable network environment and/or architecture for providing network data access and services, such as the network environments and architectures shown in FIGS. 1A, 1B, 2A, and 2B. Additionally, the chat environment 300 can be implemented, at least in part, through an applicable computing system and/or network device, such as the computing system shown in FIG. 7 and the network device shown in FIG. 8.

The example chat environment 300 shown in FIG. 3 includes a customer 302, a CSR 304 and a user-specific type-ahead chat platform 306. The customer 302 and the CSR 304 are intended to represent applicable devices through which the customer and the CSR can communicate in a chat session. For example, the customer 302 and the CSR 304 can represent an applicable client device that includes an applicable computing system, such as the computing system shown in FIG. 7. More specifically, the customer 302 and the CSR 304 can be devices that are used to receive data and display messages as part of a chat between the customer and the CSR. As discussed previously, while the chat environment 300 is shown as users who are a customer and a CSR, in various embodiments, the chat environment 300 is not merely limited to a customer and a CSR but can be a chat environment between two or more users who are not in a customer and a CSR relationship. For example, the chat environment 300 can be a chat environment between two coworkers.

The user-specific type-ahead chat platform 306 is intended to represent a platform that facilitates chat communications between the customer 302 and the CSR 304 in a chat session. Chat communications in a chat session, as used herein, include messages transmitted in real-time between users in the chat session, e.g. to simulate an actual spoken conversation between the users. Messages transmitted in a chat session can include one or a combination of text messages, audio messages, video messages, and pictures/graphics. Further, messages transmitted in a chat session can be transmitted as a point-to-point/unicast communication or a multicast communication. For example, a message transmitted in a chat session can be transmitted to multiple users participating in the chat session through a multicast communication.

Further, the user-specific type-ahead chat platform 306 is intended to represent a platform that facilitates communications between users in a chat session through type-ahead suggesting. Type-ahead suggesting, as used herein, includes suggesting a message to potentially be transmitted to a user in a chat session. More specifically, type-ahead suggesting can include providing a type-ahead suggestion, e.g. a completed message, to potentially be communicated in a chat session based, at least in part, on message input received from a user in a chat session. Message input, as used herein, can include one or an applicable combination of part of a completed message, part of a completed word in a message, a full word in a completed message, a completed message, and an accepted type-ahead suggestion. In facilitating communications between users in a chat session through type-ahead suggesting, the user-specific type-ahead chat platform 306 can facilitate quicker and easier communication between users in a chat session. Specifically, through type-ahead suggesting, a user no longer needs to completely input an entire message before communicating the message to another user in a chat session, thereby allowing the user to communicate more easily and quickly in the chat session. In turn, this can allow a user, e.g. a CSR, to more easily and quickly communicate messages with different users, e.g. customers, in different concurrently existing chat sessions.

Messages transmitted in a chat session by the user-specific type-ahead chat platform 306 can include message input that is received from a user in a chat session and is transmitted to or otherwise presented to another user in a chat session. For example, a message transmitted in a chat session can include a question about a product, as included as part of message input from a customer, which can subsequently be presented to a CSR for the product in the chat session. Additionally, the user-specific type-ahead chat platform 306 can receive additional message input from a user based on message input presented to the user. For example, the user-specific type-ahead chat platform 306 can present to a CSR a question about billing as indicated by message input from a customer. Further in the example, the user-specific type-ahead chat platform 306 can receive message input from the CSR that includes a partial answer to the question in response to the message input of the question received from the customer.

In facilitating communication in a chat session through type-ahead suggesting, the user-specific type-ahead chat platform 306 can select a type-ahead suggestion for a message in the chat session. More specifically, the user-specific type-ahead chat platform 306 can select a type-ahead suggestion for a message based, at least in part, on received message input from a user in a chat session. For example, the user-specific type-ahead chat platform 306 can receive a portion of a question as part of message input and select the completed question from the message input. In another example, the user-specific type-ahead chat platform 306 can receive a first completed question communicated during a chat session, e.g. as message input, and select a second completed question based on the first completed question. In yet another example, the user-specific type-ahead chat platform 306 can receive a question as message input from a customer and select a type-ahead suggestion for a CSR that is an answer to the question based, at least in part, on the question received as message input from the customer.

Additionally, in facilitating communication in a chat session through type-ahead suggesting, the user-specific type-ahead chat platform 306 can present a selected type-ahead suggestion to a user. More specifically, the user-specific type-ahead chat platform 306 can present to a user a type-ahead suggestion selected for the user based, at least in part, on message input from the user. Subsequently, the user-specific type-ahead chat platform 306 can present, or otherwise transmit, a selected type-ahead suggestion for a user, e.g. as received message input, to another user in a chat session. For example, the user-specific type-ahead chat platform 306 can present a type-ahead suggestion that is an answer to a billing query to a CSR in a chat session with a customer. Further in the example, the user-specific type-ahead chat platform 306 can transmit and otherwise present the answer to the billing query to the customer through the chat session.

The user-specific type-ahead chat platform 306 can transmit a type-ahead suggestion to a user based on acceptance of the type-ahead suggestion. For example, the user-specific type-ahead chat platform 306 can receive acceptance or approval of a type-ahead suggestion from a first user in a chat session and subsequently transmit the type-ahead suggestion to a second user in the chat session in response to the acceptance received from the first user. In another example, the user-specific type-ahead chat platform 306 can receive disapproval or rejection of a type-ahead suggestion from a first user in a chat session and subsequently refrain from transmitting the type-ahead suggestion to a second user in the chat session in response to the disapproval received from the first user.

The user-specific type-ahead chat platform 306 includes a first user-specific type-ahead domain 308 and a second user-specific type-ahead domain 310. A type-ahead domain, as used herein, includes one or more type-ahead libraries of mappings of message inputs to type-ahead suggestions. Specifically, a type-ahead domain can include mappings of completed messages, e.g. type-ahead suggestions, to one or a combination of parts of a completed message, parts of a completed word in a message, full words in a completed message, completed messages, and accepted type-ahead suggestions. For example, a type-ahead domain can include a mapping from the incomplete message of "cost ben" to the complete message of "cost benefit analysis." In another example, a type-ahead domain for a customer service representative can include a mapping from the customer phrase "what is the monthly billing date" to the phrase "the billing date is the $1^{st}$ of every month."

A type-ahead domain can be a user-specific type-ahead domain that is specific to characteristics of one or more users, e.g. in a chat session. Characteristics of a user can include applicable features or qualities that can define or describe a user. For example, characteristics of a user can include one or a combination of an age of a user, a gender of a user, a personality of a user, a location of a user, and an occupation of a user. Further, characteristics of a user can include context of a user with respect to a chat session of the user. Specifically, context of a user with respect to a specific chat session can include applicable features or qualities of the user that define or otherwise indicate why the user is in the chat session and/or the goals of the user in participating in the chat session. For example, context of a user with respect to a specific chat session can include that the user is a customer who is asking billing questions about a specific product. In another example, context of a user with respect to a specific chat session can include that the user is a customer who purchased a product and is participating in a chat for technical support for the product. In yet another example, context of a user with respect to a specific chat session can include one or more products that the user is interested in purchasing.

In being specific to characteristics of users, a type-ahead domain can be used to provide type-ahead suggestions for one or more users in a chat session that include a user having the same or related characteristics specific to the type-ahead domain. Accordingly, user-specific type-ahead suggestions can be provided to one or more users in a chat session through the use of a type-ahead domain that is specific to characteristics of users. More specifically, a type-ahead domain can be selected for a user based on characteristics of the user. Subsequently, the type-ahead domain can be used to select type-ahead suggestions in a chat session for either or both the user or other users in the chat session. For example, if a customer is interested in a specific smart phone plan, then a specific type-ahead domain for users interested in the specific smart phone plan can be selected to provide type-ahead suggestions for the customer in a chat session. Further in the example, the specific type-ahead domain can be used to provide type-ahead suggestions for a CSR communicating with the customer in the chat session. Utilizing a user-specific type-ahead domain to provide type-ahead suggestions in a chat session can further facilitate more accurate and relevant type-ahead suggestions for users in the chat session. Explicitly, utilizing a user-specific type-ahead domain to provide type-ahead suggestions can facilitate selection, and potentially presentation, of type-ahead suggestions that are relevant to one or more users in a chat based on characteristics of the users. This can further facilitate easier and more efficient communication between users, e.g. customers and CSRs, in a chat session.

The user-specific type-ahead chat platform 306 can identify one or more characteristics of a user in a chat session for purposes of providing type-ahead suggestions to users in the chat session. For example, the user-specific type-ahead chat platform 306 can identify that a user is interested in billing questions about a specific product. The user-specific type-ahead chat platform 306 can identify one or more characteristics of a user in a chat session based on either or both current and past chat session of the user. More specifically, the user-specific type-ahead chat platform 306 can identify characteristics of a user based on message input of a user in a chat session, type-ahead suggestions presented to a user in a chat session, accepted type-ahead suggestions of a user in a chat session, and rejected type-ahead suggestions of a user in a chat session. For example, if a user provides message input asking a billing question, then the user-specific type-ahead chat platform 306 can determine the user is interested in billing questions. In another example, if a user rejects a type-ahead suggestion for a specific product, then the user-specific type-ahead chat platform 306 can determine the user is not interested in the specific product.

Further, the user-specific type-ahead chat platform 306 can identify one or more characteristics of a user in a chat session based on interactions of the user with a website. For example, if a user initiated a chat session from a webpage of a specific product, then the user-specific type-ahead chat platform 306 can determine the user is interested in the specific product. In another example, if a user posted a posted a poor review of a product, then the user-specific type-ahead chat platform 306 can determine the user is frustrated with the product and is interested in troubleshooting of the product.

The user-specific type-ahead chat platform 306 can select either or both the first user-specific type-ahead domain 308 and the second user-specific type-ahead domain 310 based on one or more characteristics of either or both the customer 302 and the CSR 304, e.g. as indicated by metadata for the customer 302 and the CSR 304. More specifically, the user-specific type-ahead chat platform 306 can select the first user-specific type-ahead domain 308 for the customer 302 based on characteristics of the customer 302 and can select the second user-specific type-ahead domain 310 for the CSR 304 based on the characteristics of the customer 302. For example, if the customer 302 is chatting with the CSR 304 about billing questions, then the user-specific type-ahead chat platform 306 can select a billing question domain as the first user-specific type-ahead domain 308 for the customer 302 and a billing answer domain as the second user-specific type-ahead domain 310 for the CSR 304.

By selecting a user-specific type-ahead domain based on one or more characteristics of users in a chat session, the user-specific type-ahead chat platform 306 can facilitate more accurate and relevant type-ahead suggesting in the chat session. Specifically, a user-specific type-ahead domain selected based on characteristics of a user in a chat session can be used to provide more relevant type-ahead suggestions to the user based on their characteristics. This is advantageous as it promotes easier and faster communication between users in a chat session as a user can select from less presented type-ahead suggestions, e.g. less irrelevant type-ahead suggestions are presented to the user.

Additionally, the user-specific type-ahead chat platform 306 can select either or both the first user-specific type-ahead domain 308 and the second user-specific type-ahead domain 310 based on message input received from either or both the customer 302 and the CSR 304. Specifically, the user-specific type-ahead chat platform 306 can identify one or more characteristics of either or both the customer 302 and the CSR 304 from corresponding received message input and subsequently select either or both the first user-specific type-ahead domain 308 and the second user-specific type-ahead domain 310 based on the one or more characteristics. For example, the user-specific type-ahead chat platform 306 can receive message input including a technical support question about a specific product from the customer 302. Subsequently, the user-specific type-ahead chat platform 306 can select a technical support type-ahead domain for the CSR 304 based the question about the specific product in the message input received from the customer 302.

Further, the user-specific type-ahead chat platform 306 can select either or both the first user-specific type-ahead domain 308 and the second user-specific type-ahead domain 310 based on interactions of the customer 302 with a product provider. Specifically, the user-specific type-ahead chat platform 306 can select either or both the first user-specific type-ahead domain 308 and the second user-specific type-ahead domain 310 based on the customer's 302 interactions with a website of a product provider. For example, if the customer 302 looked at a specific product through a website of a product provider, then the user-specific type-ahead chat platform 306 can select the first user-specific type-ahead domain 308 to provide type-ahead suggestions of questions about the specific product to the customer 302. Further in the example, the user-specific type-ahead chat platform 306 can select the second user-specific type-ahead domain 310 to provide type-ahead answers to questions about the specific product to the CSR 304.

The user-specific type-ahead chat platform 306 can select the first user-specific type-ahead domain 308 and the second user-specific type-ahead domain 310 as the same user-specific type-ahead domain. Specifically, the first user-specific type-ahead domain 308 can be the same user-specific type-ahead domain as the second user-specific type-ahead domain 310. For example, the first user-specific type-ahead domain 308 and the second user-specific type-ahead domain 310 can be the same type-ahead domain for suggesting billing questions and answers about a product. Alternatively, the user-specific type-ahead chat platform 306 can select the first user-specific type-ahead domain 308 and the second user-specific type-ahead domain 310 as different user-specific type-ahead domains. Specifically, the first user-specific type-ahead domain 308 can be a different user-specific type-ahead domain as the second user-specific type-ahead domain 310. For example, the first user-specific type-ahead domain 308 can be a type-ahead domain for suggesting technical support questions for a product and the second user-specific type-ahead domain 310 can be a type-ahead domain for suggesting technical support answers for the product.

Additionally, the user-specific type-ahead chat platform 306 can dynamically select or otherwise switch between different user-specific type-ahead domains within a chat session. Specifically, the user-specific type-ahead chat platform 306 can select a first type-ahead domain for the customer 302 in a chat session and subsequently switch to or select another type-ahead domain for the consumer 302 in the chat session. The user-specific type-ahead chat platform 306 can switch between different user-specific type-ahead domains for a user in a chat session based on acceptance and rejection of type-ahead suggestions selected using the type-ahead domains. For example, if the customer 302 continues to reject type-ahead suggestions selected using a first type-ahead domain, then the user-specific type-ahead chat platform 306 can switch to a new type-ahead domain for purposes of selecting type-ahead suggestions for the customer 302 in a chat session.

The user-specific type-ahead chat platform 306 can select and subsequently present a type-ahead suggestion to a user based on one or more characteristics of the user through a user-specific type-ahead domain. Specifically, the user-specific type-ahead chat platform 306 can select a user-specific type-ahead domain based on one or more characteristics of a user and subsequently utilize the type-ahead domain to select and present type-ahead suggestions to the user based on the characteristics of the user. For example, the user-specific type-ahead chat platform 306 can select the first user-specific type-ahead domain 308 and the second user-specific type-ahead domain 310 based on one or more characteristics of the customer 302. Further in the example, the user-specific type-ahead chat platform 306 can use the first user-specific type-ahead domain 308 to select type-ahead suggestions for the customer 302 and use the second user-specific type-ahead domain 310 to select type-ahead suggestions for the CSR 304, effectively selecting type-ahead suggestions for the customer 302 and the CSR 304 based on the one or more characteristics of the customer 302.

Further, the user-specific type-ahead chat platform 306 can select and subsequently present a type-ahead suggestion based on characteristics of the user and received message input. Specifically, the user-specific type-ahead chat platform 306 can select a user-specific type-ahead domain based on one or more characteristics of a user and subsequently utilize the type-ahead domain and received message input to select and present type-ahead suggestions to users. For example, the user-specific type-ahead chat platform 306 can select a user-specific type-ahead domain based on characteristics of the customer 302 in starting a chat session from a specific product webpage on a manufacturer's website. Further in the example, the user-specific type-ahead chat platform 306 can select a type-ahead suggestion for the CSR based on message input received from the customer 302 in the chat session, message input received from the CSR 304 in the chat session, and the characteristics of the customer 302 using the selected type-ahead domain.

Additionally, a user can manually control type-ahead suggesting by the user-specific type-ahead chat platform 306. Specifically, a user can manually select a user-specific type-ahead domain. Subsequently, the user-specific type-ahead chat platform 306 can present type-ahead suggestions to the user based on the user-specific type-ahead domain selected manually by the user. For example, a CSR can manually select a user-specific type-ahead domain for a specific product the CSR is chatting about with a customer. Further in the example, the user-specific type-ahead chat platform 306 can provide type-ahead suggestions to the CSR using the user-specific type-ahead domain for the specific product that is manually selected by the CSR. In manually choosing a user-specific type-ahead domain, a user can manually, or otherwise passively, switch between different type-ahead domains. This can provide a user with greater control in managing different chat sessions of the user, e.g. concurrent chat sessions.

The user-specific type-ahead chat platform 306 can maintain user-specific type-ahead domains based on a knowledge base. A knowledge base can include or otherwise be generated from an applicable corpus of information for building a user-specific type-ahead domain. For example, a knowledge base can be generated from a product manual for a product. Further, a knowledge base can include or otherwise be generated from a corpus of information specific to or otherwise selected based on a user of a user-specific type-ahead domain. For example, a knowledge base for a CSR offering assistance for a specific product can include a technical support manual for the specific product.

In maintaining a knowledge base, the user-specific type-ahead chat platform 306 can update or otherwise modify a knowledge base. For example, the user-specific type-ahead chat platform 306 can update a knowledge base of commonly asked questions of a consumer to remove questions that are actually not asked by consumers. The user-specific type-ahead chat platform 306 can modify a knowledge base based on acceptance of type-ahead suggestions. For example, if a customer service representative constantly accepts a type-ahead suggestion of the same answer to a question, then the user-specific type-ahead chat platform 306 can update a knowledge base of common customer service answers to include the answer constantly accepted by the customer service representative. Additionally, the user-specific type-ahead chat platform 306 can modify a knowledge base based on rejection of type-ahead suggestions. For example, if a billing question is constantly rejected by a customer, then the user-specific type-ahead chat platform 306 can remove the billing question from a knowledge base of common customer billing questions. In modifying a knowledge base, e.g. based on accepted and rejected type-ahead suggestions, the user-specific type-ahead chat platform 306 can maintain a knowledge base that can be used to create more accurate and/or relevant type-ahead domains.

A knowledge base, e.g. maintained by the user-specific type-ahead chat platform 306 can include scores. Scores can relate message input to type-ahead suggestions in a knowledge base and server to rank based on a likelihood that a type-ahead suggestion will be accepted for specific message input. For example, a score can indicate a preferable answer to a question, e.g. input by a consumer. Still further in the example, the score can include a numerical value indicating a likelihood that the answer will be accepted if the question is received as part of message input. In maintaining scores, the user-specific type-ahead chat platform 306 can increase or decrease a score relating message input to type-ahead suggestion. The user-specific type-ahead chat platform 306 can maintain scores in a knowledge base according to accepted and rejected type-ahead suggestions. For example, if a type-ahead suggestion for specific message input is rejected, then the user-specific type-ahead chat platform 306 can lower a score relating the suggestion to the message input. Conversely, if the type-ahead suggestion for the specific message input is accepted, then the user-specific type-ahead chat platform 306 can increase the score relating the suggestion to the message input.

The user-specific type-ahead chat platform 306 can maintain user-specific type-ahead domains based on acceptance of type-ahead suggestions selected and presented to users in a chat session. Specifically, if a user accepts a type-ahead suggestion selected, based at least in part on specific message input, then the user-specific type-ahead chat platform 306 can update one or more type-ahead domains to associate the type-ahead suggestion with the specific message input. For example, a customer 302 can accept a type-ahead suggestion for a question selected using the first user-specific type-ahead domain 308 based on message input of a portion of the question. Further in the example, the user-specific type-ahead chat platform 306 can update the second user-specific type-ahead domain 310 for the CSR 304 to include a mapping of the portion of the question to the type-ahead suggestion for the question accepted by the customer 302.

Additionally, the user-specific type-ahead chat platform 306 can maintain user-specific type-ahead domains based on rejection of type-ahead suggestions selected and presented to users in a chat session. Specifically, if a user rejects a type-ahead suggestion selected, based at least in part on specific message input, then the user-specific type-ahead chat platform 306 can update one or more type-ahead domains to disassociate, or otherwise not include an association of the type-ahead suggestion with the specific message input. For example, a customer 302 can reject a type-ahead suggestion for a question selected using the first user-specific type-ahead domain 308 based on message input of a portion of the question. Further in the example, the user-specific type-ahead chat platform 306 can update either or both the first user-specific type-ahead domain 308 and the second user-specific type-ahead domain 310 to disassociate the portion of the question from the type-ahead suggestion for the question rejected by the customer 302.

The user-specific type-ahead chat platform 306 can present rejected type-ahead suggestions, message input used to select, at least in part, the rejected suggestions, and/or indications of rejections of the type-ahead suggestions to one or more users in a chat session. More specifically, the user-specific type-ahead chat platform 306 can present rejected type-ahead suggestions, message input used to select the suggestions, and/or indications of rejections of the type-ahead suggestions to another user who is participating in a chat session of a user who rejected the type-ahead suggestions. For example, if the customer 302 rejects a type-ahead suggestion, then the user-specific type-ahead chat platform 306 can present the type-ahead suggestion and an indication that the suggestion was rejected by the customer 302 to the CSR 304. This information can be used by the CSR 304 to accept or reject type-ahead suggestions, in turn facilitating easier communication between the customer 302 and the representative 304 in a chat session. For example, if the customer 302 rejects a type-ahead suggestion of the specific question, then the user-specific type-ahead chat platform 306 can presented the rejected type-ahead suggestion of the specific question to the CSR 304. Further in the example, the CSR 304 can subsequently reject a type-ahead suggestion of an answer to the specific question based on the rejection of the specific question as a type-ahead suggestion by the customer 302.

Further, the user-specific type-ahead chat platform 306 can present accepted type-ahead suggestions, message input used to select, at least in part, the accepted suggestions, and/or indications of acceptances of the type-ahead suggestions to one or more users in a chat session. More specifically, the user-specific type-ahead chat platform 306 can present accepted type-ahead suggestions, message input used to select the suggestions, and/or indications of acceptances of the type-ahead suggestions to another user who is participating in a chat session of a user who accepted the type-ahead suggestions. For example, if the customer 302 accepts a type-ahead suggestion, then the user-specific type-ahead chat platform 306 can present the accepted type-ahead suggestion and message input used to select the accepted type-ahead suggestion to the CSR 304. This information can be used by the CSR 304 to accept or reject type-ahead suggestions, in turn facilitating easier communication between the customer 302 and the representative 304 in a chat session.

The user-specific type-ahead chat platform 306 can be implemented, at least in part, as an asynchronous platform and can asynchronously perform applicable previously described functions. Specifically, the user-specific type-ahead chat platform 306 can perform applicable previously described functions separate from a chat session and/or functions performed in facilitating chat in a chat session. For example, the user-specific type-ahead chat platform 306 can maintain a knowledge base separately from a chat session. Further in the example, the user-specific type-ahead chat platform 306 can update the knowledge base according to accepted and rejected type-ahead suggestions after the chat session has ended. In another example, the user-specific type-ahead chat platform 306 can select and/or maintain a user-specific type-ahead domain separately from a chat session. Further in the another example, the user-specific type-ahead chat platform 306 can select the user-specific type-ahead domain before the chat session begins or is otherwise initiated.

In an example of operation of the example chat environment 300 shown in FIG. 3, the user-specific type-ahead chat platform 306 can connect the customer 302 and the CSR 304 to chat in a chat session. In the example of operation of the example chat environment 300 shown in FIG. 3, the user-specific type-ahead chat platform 306 can receive, at 312, customer message input from the customer 302. Further, in the example of operation, the user-specific type-ahead chat platform 306 can provide a customer type-ahead suggestion, at 314, to the customer 302. The user-specific type-ahead chat platform 306 can select the provided customer type-ahead suggestion based on the customer message input received at 312 and one or more characteristics of the customer 302 using the first user-specific type-ahead domain 308. In the example of operation, the user-specific type-ahead chat platform 306 can receive from the customer 302, at 316, an indication of acceptance of the type-ahead suggestion presented to the customer 302 at 314. Subsequently, based on acceptance of the type-ahead suggestion received at 316, the user-specific type-ahead chat platform 306 can present, at 318, the type-ahead suggestion to the CSR 304. Accordingly, the user-specific type-ahead chat platform 306 can provide communications between the customer 302 and the CSR 304 in the chat session through type-ahead suggesting.

In the example of operation of the example chat environment 300 shown in FIG. 3, the user-specific type-ahead chat platform 306 can receive, at 320, message input from the CSR 304. The message input received at 320 can be received from the CSR 304 in response to the type-ahead suggestion accepted by the customer 302 and presented to the CSR 304 at 318, e.g. as message input. Further, in the example of operation, the user-specific type-ahead chat platform 306 can provide a CSR type-ahead suggestion, at 322, to the CSR 304. The user-specific type-ahead chat platform 306 can select the provided CSR type-ahead suggestion based on the message input received at 320 and one or more characteristics of the customer 302 using the second user-specific type-ahead domain 310. In the example of operation, the user-specific type-ahead chat platform 306 can receive from the CSR 304, at 324, an indication of acceptance of the type-ahead suggestion presented to the CSR 304 at 322. Subsequently, based on acceptance of the type-ahead suggestion received at 324, the user-specific type-ahead chat platform 306 can present, at 326, the type-ahead suggestion to the customer 302. Accordingly, the user-specific type-ahead chat platform 306 can further provide communications between the customer 302 and the CSR 304 in the chat session through type-ahead suggesting.

Figure 4:
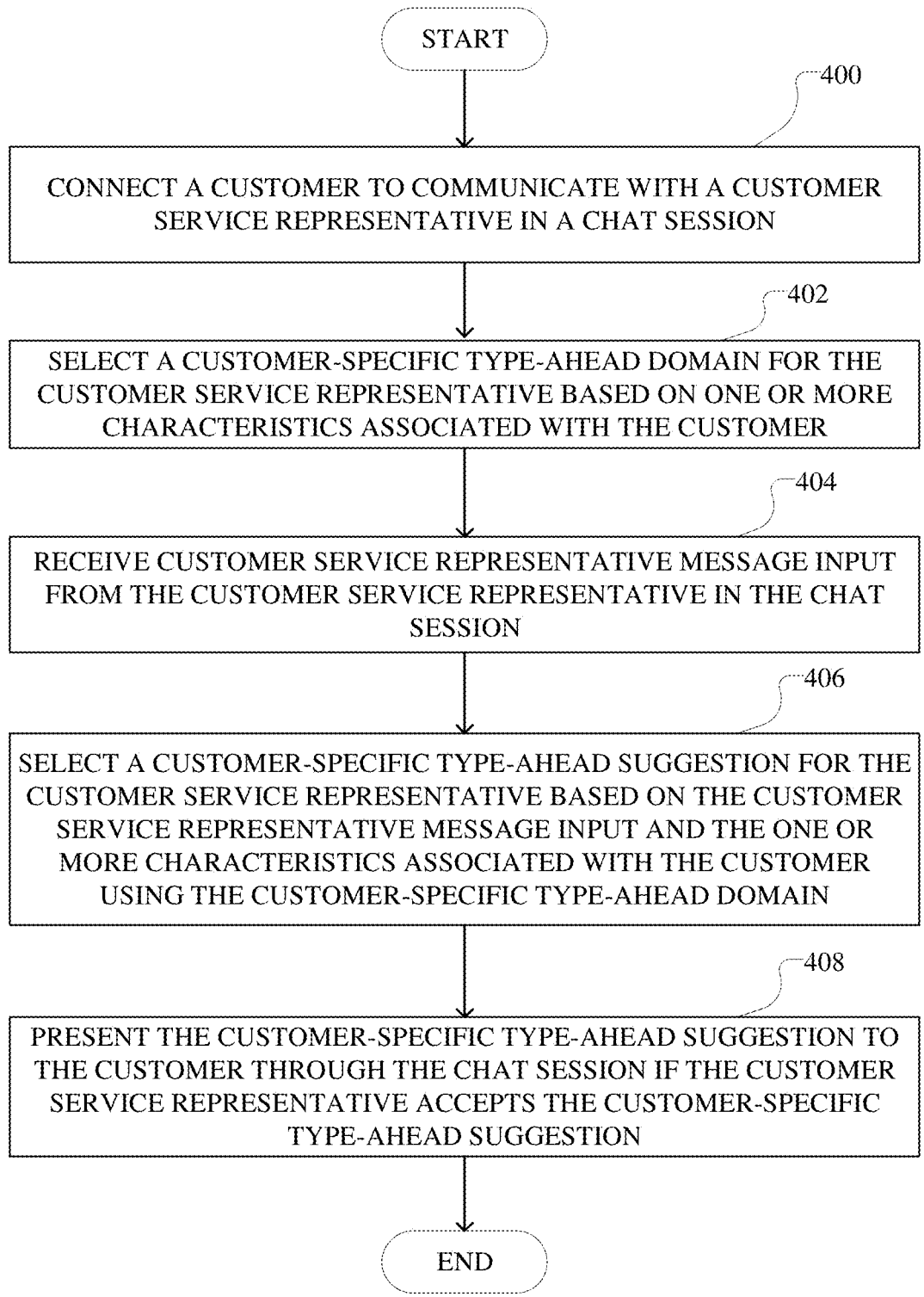
FIG. 4 illustrates a flowchart of an example type-ahead suggestion method for a CSR in a chat session.

FIG. 4 illustrates a flowchart of an example type-ahead suggestion method for a CSR in a chat session. The method shown in FIG. 4 is provided by way of example, as there are a variety of ways to carry out the method. Additionally, while the example method is illustrated with a particular order of steps, those of ordinary skill in the art will appreciate that FIG. 4 and the modules shown therein can be executed in any order and can include fewer or more modules than illustrated.

Each module shown in FIG. 4 represents one or more steps, processes, methods or routines in the method. For the sake of clarity and explanation purposes, the modules in FIG. 4 are described with reference to the chat environment 300 shown in FIG. 3.

At step 400, the user-specific type-ahead chat platform 306 connects a customer with a CSR in a chat session. In connecting a customer with a CSR in a chat session, the user-specific type-ahead chat platform 306 can receive message input from the customer and transmit the message input to the CSR in the chat session. Vice versa, the user-specific type-ahead chat platform 306 can receive message input from a CSR and transmit the message input to a customer in a chat session.

At step 402, the user-specific type-ahead chat platform 306 selects a customer-specific type-ahead domain for the CSR based on one or more characteristics associated with the customer. For example, the user-specific type-ahead chat platform 306 can select the customer-specific type-ahead domain based on a context of the customer, e.g. as determined from one or more characteristics of the customer in chatting with the CSR in the chat session. The user-specific type-ahead chat platform 306 can select the customer-specific type-ahead domain for the CSR based on one or more characteristics associated with the customer, as indicated by message input received from either or both the CSR and the customer.

At step 404, the user-specific type-ahead chat platform 306 can receive CSR message input from the CSR in the chat session. CSR message input can include a portion of an answer or a word in an answer provided by the CSR. The user-specific type-ahead chat platform 306 can receive CSR message input in response to message input from the customer, e.g. a type-ahead suggestion accepted by the customer, which is subsequently transmitted to the CSR in the chat session.

At step 406, the user-specific type-ahead chat platform 306 selects a customer-specific type-ahead suggestion for the CSR based on the CSR message input and the one or more characteristics associated with the customer. Specifically, the user-specific type-ahead chat platform 306 can select a customer-specific type-ahead suggestion based on the message input and the characteristics associated with the customer using the customer-specific type-ahead domain selected for the CSR. For example, the user-specific type-ahead chat platform 306 can look up a mapping of the message input to a type-ahead suggestion in the customer-specific type-ahead domain selected based on characteristics of the customer. Further in the example, the user-specific type-ahead chat platform 306 can select the type-ahead suggestion as a customer-specific type-ahead suggestion for the CSR based on the one or more characteristics associated with the customer using the selected type-ahead domain.

At step 408, the user-specific type-ahead chat platform 306 can present the customer-specific type-ahead suggestion to the customer through the chat session if the CSR accepts the customer-specific type-ahead suggestion. Specifically, the user-specific type-ahead chat platform 306 can present the selected customer-specific type-ahead suggestion to the CSR and receive either acceptance or rejection of the suggestion from the CSR. Subsequently, the user-specific type-ahead chat platform 306 can present the type-ahead suggestion to the customer through the chat session if the CSR provides the user-specific type-ahead chat platform 306 an indicator of acceptance of the suggestion.

Figure 5:
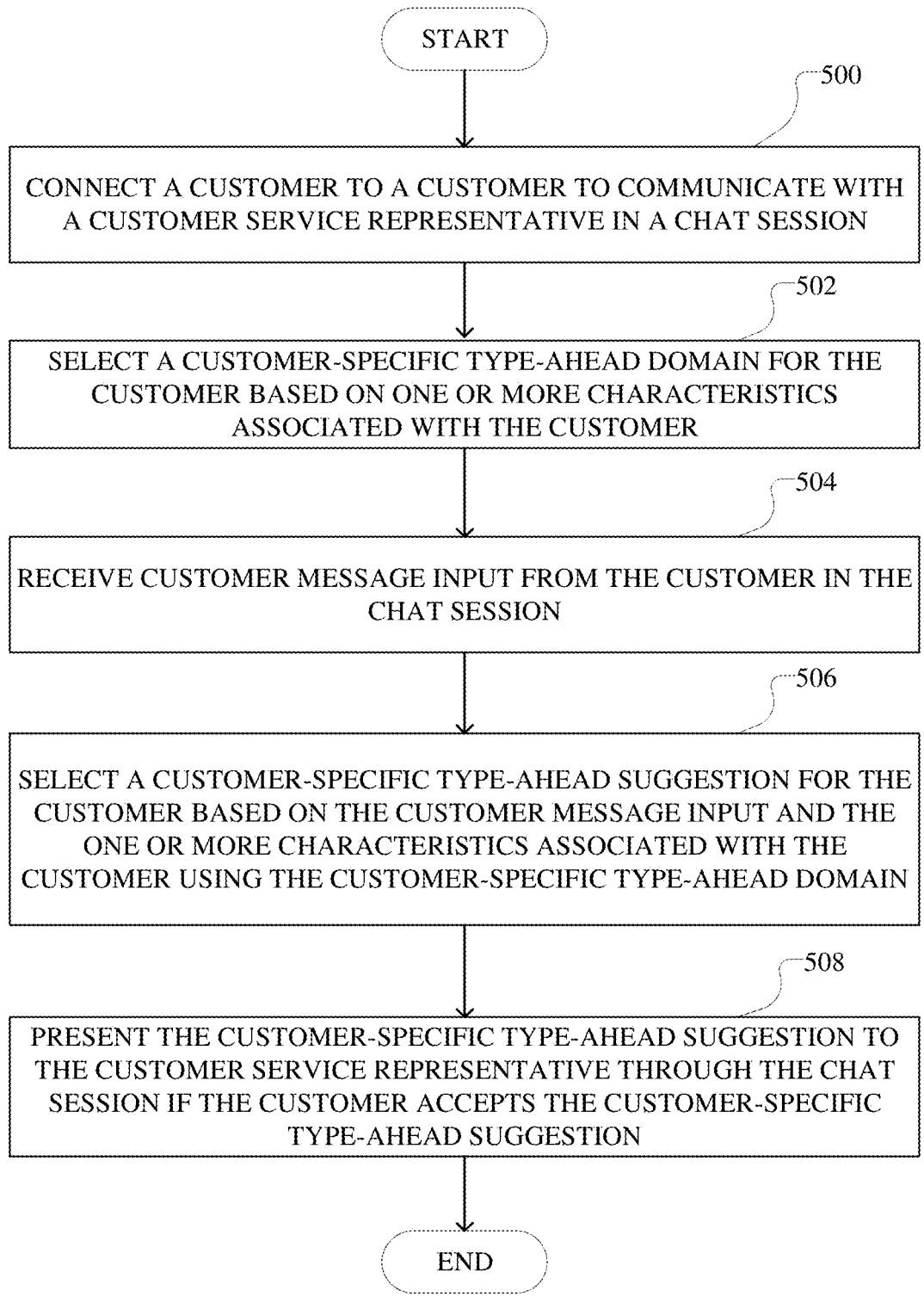
FIG. 5 illustrates a flowchart of an example type-ahead suggestion method for a customer in a chat session.

FIG. 5 illustrates a flowchart of an example type-ahead suggestion method for a customer in a chat session. The method shown in FIG. 5 is provided by way of example, as there are a variety of ways to carry out the method. Additionally, while the example method is illustrated with a particular order of steps, those of ordinary skill in the art will appreciate that FIG. 5 and the modules shown therein can be executed in any order and can include fewer or more modules than illustrated.

Each module shown in FIG. 5 represents one or more steps, processes, methods or routines in the method. For the sake of clarity and explanation purposes, the modules in FIG. 5 are described with reference to the chat environment 300 shown in FIG. 3.

At step 500, the user-specific type-ahead chat platform 306 connects a customer with a CSR in a chat session. In connecting a customer with a CSR in a chat session, the user-specific type-ahead chat platform 306 can receive message input from the customer and transmit the message input to the CSR in the chat session. Vice versa, the user-specific type-ahead chat platform 306 can receive message input from a CSR and transmit the message input to a customer in a chat session.

At step 502, the user-specific type-ahead chat platform 306 selects a customer-specific type-ahead domain for the customer based on one or more characteristics associated with the customer. For example, the user-specific type-ahead chat platform 306 can select the customer-specific type-ahead domain based on an area of a webpage of a product manufacturer from which the customer initiated the chat session. The user-specific type-ahead chat platform 306 can select the customer-specific type-ahead domain for the customer based on one or more characteristics associated with the customer, as indicated by message input received from either or both the CSR and the customer. For example, the user-specific type-ahead chat platform 306 can identify the customer is interested in a specific service from message input received from the customer and subsequently select a type-ahead domain for the specific service.

At step 504, the user-specific type-ahead chat platform 306 can receive customer message input from the customer in the chat session. Customer message input can include a portion of a question or a word in a question provided by the customer. The user-specific type-ahead chat platform 306 can receive customer message input in response to message input from the CSR, e.g. a type-ahead suggestion accepted by the CSR, which is subsequently transmitted to the customer in the chat session.

At step 506, the user-specific type-ahead chat platform 306 selects a customer-specific type-ahead suggestion for the customer based on the customer message input and the one or more characteristics associated with the customer. Specifically, the user-specific type-ahead chat platform 306 can select a customer-specific type-ahead suggestion based on the message input and the characteristics associated with the customer using the customer-specific type-ahead domain selected for the customer. For example, the user-specific type-ahead chat platform 306 can look up a mapping of the message input to a type-ahead suggestion in the customer-specific type-ahead domain selected based on characteristics of the customer. Further in the example, the user-specific type-ahead chat platform 306 can select the type-ahead suggestion as a customer-specific type-ahead suggestion for the customer based on the one or more characteristics associated with the customer using the selected type-ahead domain.

At step 508, the user-specific type-ahead chat platform 306 can present the customer-specific type-ahead suggestion to the CSR through the chat session if the customer accepts the customer-specific type-ahead suggestion. Specifically, the user-specific type-ahead chat platform 306 can present the selected customer-specific type-ahead suggestion to the customer and receive either acceptance or rejection of the suggestion from the customer. Subsequently, the user-specific type-ahead chat platform 306 can present the type-ahead suggestion to the CSR through the chat session if the customer provides the user-specific type-ahead chat platform 306 an indicator of acceptance of the suggestion.

Figure 6:
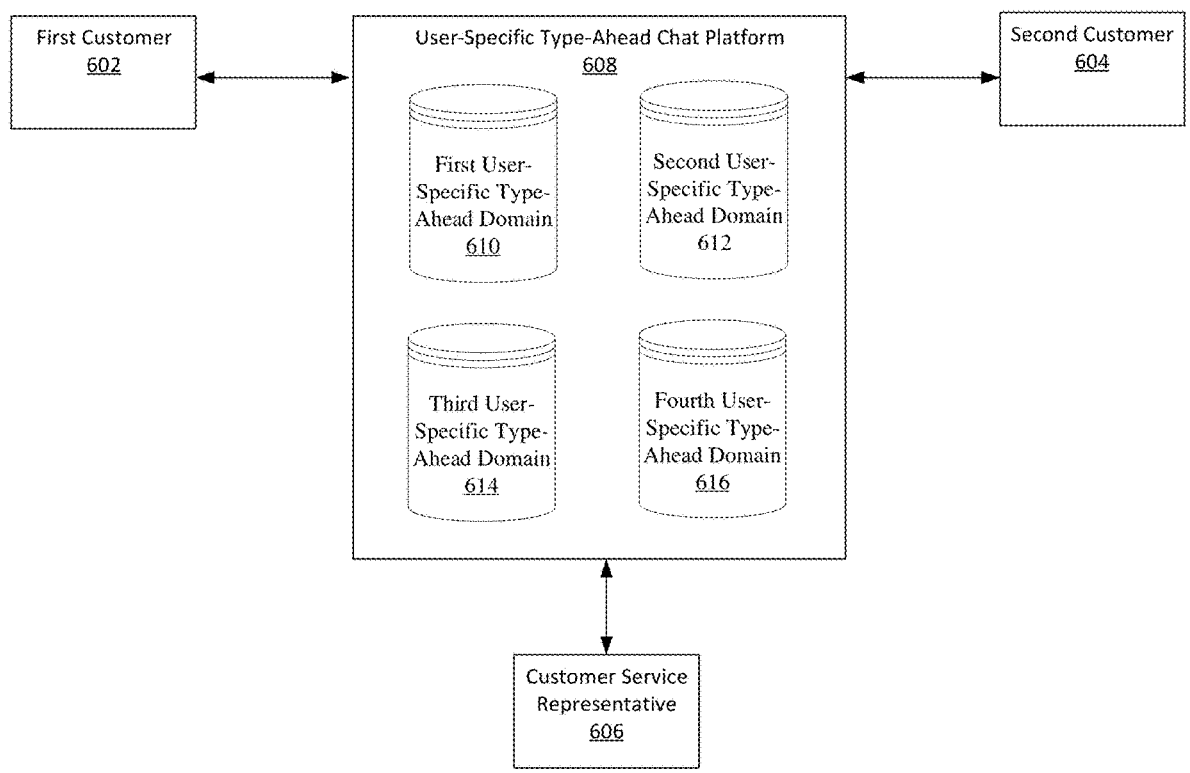
FIG. 6 depicts a chat environment 600 for providing communications between customers and a CSR using type-ahead suggestions in a plurality of concurrent chat sessions.

FIG. 6 depicts a chat environment 600 for providing communications between customers and a CSR using type-ahead suggestions in a plurality of concurrent chat sessions. The chat environment 600 includes a first customer 602, a second customer 604, a CSR 606, and a user-specific type-ahead chat platform 608. The user-specific type-ahead chat platform 608 can support concurrent chats between the CSR 606 and the first customer 602 and the CSR 606 and the second customer 604.

The user-specific type-ahead chat platform 608 includes a first user-specific type-ahead domain 610, a second user-specific type-ahead domain 612, a third user-specific type-ahead domain 614, and a fourth user-specific type-ahead domain 616. The first user-specific type-ahead domain 610 and the second user-specific type-ahead domain 612 can be used to provide type-ahead suggesting to facilitate communication between the CSR 606 and the first customer 602 according to the same principals as discussed with respect to the chat environment 300 shown in FIG. 3. Further, the third user-specific type-ahead domain 614 and the fourth user-specific type-ahead domain 616 can be used to provide type-ahead suggesting to facilitate communication between the CSR 606 and the second customer 604 according to the same principals as discussed with respect to the chat environment 300 shown in FIG. 3. In using the user-specific type-ahead domains to facilitate communication through type-ahead suggesting, the CSR 606 can more easily communicate with the first customer and the second customer 604 through concurrently existing chat sessions.

The disclosure now turns to FIGS. 7 and 8, which illustrate example network devices and computing devices, such as switches, routers, load balancers, client devices, and so forth.

FIG. 7 illustrates a computing system architecture 700 wherein the components of the system are in electrical communication with each other using a connection 705, such as a bus. Exemplary system 700 includes a processing unit (CPU or processor) 710 and a system connection 705 that couples various system components including the system memory 715, such as read only memory (ROM) 720 and random access memory (RAM) 725, to the processor 710. The system 700 can include a cache of high-speed memory connected directly with, in close proximity to, or integrated as part of the processor 710. The system 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware or software service, such as service 1 732, service 2 734, and service 3 736 stored in storage device 730, configured to control the processor 710 as well as a special-purpose processor where software instructions are incorporated into the actual processor design. The processor 710 may be a completely self-contained computing system, containing multiple cores or processors, a bus, memory controller, cache, etc. A multi-core processor may be symmetric or asymmetric.

To enable user interaction with the computing device 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing device 700. The communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include services 732, 734, 736 for controlling the processor 710. Other hardware or software modules are contemplated. The storage device 730 can be connected to the system connection 705. In one aspect, a hardware module that performs a particular function can include the software component stored in a computer-readable medium in connection with the necessary hardware components, such as the processor 710, connection 705, output device 735, and so forth, to carry out the function.

FIG. 8 illustrates an example network device 800 suitable for performing switching, routing, load balancing, and other networking operations. Network device 800 includes a central processing unit (CPU) 804, interfaces 802, and a bus 810 (e.g., a PCI bus). When acting under the control of appropriate software or firmware, the CPU 804 is responsible for executing packet management, error detection, and/or routing functions. The CPU 804 preferably accomplishes all these functions under the control of software including an operating system and any appropriate applications software. CPU 804 may include one or more processors 808, such as a processor from the INTEL X86 family of microprocessors. In some cases, processor 808 can be specially designed hardware for controlling the operations of network device 800. In some cases, a memory 806 (e.g., non-volatile RAM, ROM, etc.) also forms part of CPU 804. However, there are many different ways in which memory could be coupled to the system.

The interfaces 802 are typically provided as modular interface cards (sometimes referred to as "line cards"). Generally, they control the sending and receiving of data packets over the network and sometimes support other peripherals used with the network device 800. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 804 to efficiently perform routing computations, network diagnostics, security functions, etc.

Although the system shown in FIG. 8 is one specific network device of the present invention, it is by no means the only network device architecture on which the present invention can be implemented. For example, an architecture having a single processor that handles communications as well as routing computations, etc., is often used. Further, other types of interfaces and media could also be used with the network device 800.

Regardless of the network device's configuration, it may employ one or more memories or memory modules (including memory 806) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 806 could also hold various software containers and virtualized execution environments and data.

The network device 800 can also include an application-specific integrated circuit (ASIC), which can be configured to perform routing and/or switching operations. The ASIC can communicate with other components in the network device 800 via the bus 810, to exchange data and signals and coordinate various types of operations by the network device 800, such as routing, switching, and/or data storage operations, for example.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method comprising:
   connecting a first user to communicate through a first user device with a second user through a second user device in a first chat session;
   selecting a first user-specific type-ahead domain for the second user based on one or more characteristics associated with the first user;
   receiving second user message input from the second user in the first chat session, wherein the second user message input includes at least a portion of one or more words in a portion of a completed message received from the second user;
   selecting, in response to receipt of the second user message input from the second user in the first chat session, a first user-specific type-ahead suggestion for the second user based on both the at least a portion of one or more words in the portion of the completed message received from the second user and the one or more characteristics associated with the first user by applying the first user-specific type-ahead domain; and presenting the first user-specific type-ahead suggestion to the first user through the first chat session if the second user accepts the first user-specific type-ahead suggestion.

2. The method of claim 1, further comprising:

receiving first user message input from the first user to the second user in the first chat session;

presenting the first user message input from the first user to the second user in the first chat session;

receiving the second user message input from the second user in the first chat session in response to presentation of the first user message input from the first user to the second user in the first chat session; and selecting the first user-specific type-ahead suggestion based on the first user message input received from the first user, the second user message input, and the one or more characteristics associated with the first user using the first user-specific type-ahead domain.

3. The method of claim 2, wherein the first user-specific type-ahead domain is selected for the second user based on the first user message input from the first user to the second user received in the first chat session.

4. The method of claim 1, wherein the second user message input received from the second user in the first chat session includes a portion of a message and the first user-specific type-ahead suggestion includes a suggested completed message for the portion of the message.

5. The method of claim 1, wherein the one or more characteristics associated with the first user include a context associated with the first user.

6. The method of claim 1, further comprising:

receiving a rejection of the first user-specific type-ahead suggestion from the second user in response to presenting the first user-specific type-ahead suggestion to the second user; and updating one or more user-specific type-ahead domains, including the first user-specific type-ahead domain selected for the second user, based on the rejection of the first user-specific type-ahead suggestion by the second user.

7. The method of claim 1, further comprising:

selecting a second user-specific type-ahead domain for the first user based on the one or more characteristics associated with the first user;

receiving first user message input from the first user in the first chat session;

selecting a second user-specific type-ahead suggestion for the first user in response to receipt of the first user message input from the first user in the first chat session based on both the first user message input and the one or more characteristics associated with the first user using the second user-specific type-ahead domain selected based on the one or more characteristics associated with the first user; and presenting the second user-specific type-ahead suggestion to the second user in the first chat session if the first user accepts the second user-specific type-ahead suggestion.

8. The method of claim 7, wherein the second user-specific type-ahead domain is a same type-ahead domain as the first user-specific type-ahead domain.

9. The method of claim 7, wherein the second user-specific type-ahead domain is a different type-ahead domain from the first user-specific type-ahead domain.

10. The method of claim 9, wherein the first user-specific type-ahead domain is a type-ahead domain for a customer service representatives and the second user-specific type-ahead domain is a type-ahead domain for customers.

11. The method of claim 7, further comprising:

receiving a rejection of the second user-specific type-ahead suggestion from the first user in response to presenting the second user-specific type-ahead suggestion to the first user; and updating one or more user-specific type-ahead domains, including the second user-specific type-ahead domain selected for the first user, based on the rejection of the second user-specific type-ahead suggestion by the first user.

12. The method of claim 7, further comprising presenting rejection indications and corresponding rejected user-specific type-ahead suggestions of the first user along with the second user-specific type-ahead suggestion to the second user through the first chat session.

13. The method of claim 1, further comprising:

connecting a third user to communicate through a third user device with the second user through the second user device in a second chat session concurrently with the first user communicating with the second user in the first chat session;

selecting another user-specific type-ahead domain for the second user based on one or more characteristics associated with the third user;

receiving additional second user message input from the second user in the second chat session;

selecting another user-specific type-ahead suggestion for the second user in response to receipt of the additional second user message input from the second user in the second chat session based on both the additional second user message input and the one or more characteristics associated with the third user using the other user-specific type-ahead domain selected based on the one or more characteristics associated with the third user; and presenting the another user-specific type-ahead suggestion to the third user through the second chat session if the second user accepts the another user-specific type-ahead suggestion.

14. The method of claim 13, further comprising:

receiving a rejection of the other user-specific type-ahead suggestion from the second user in response to presenting the another user-specific type-ahead suggestion to the second user; and updating a plurality of user-specific type-ahead domains, including the first user-specific type-ahead domain selected for the second user for the first chat session and the another user-specific type-ahead domain selected for the second user for the second chat session, based on the rejection of the another user-specific type-ahead suggestion by the second user.

15. A system comprising:

one or more processors; and at least one non-transitory computer-readable storage medium having stored therein instructions which, when executed by the one or more processors, cause the one or more processors to perform operations comprising:

connecting a first user to communicate through a first user device with a second user through a second user device in a first chat session;

selecting a first user-specific type-ahead domain for the second user based on a context associated with the first user;

receiving second user message input from the second user in the first chat session wherein the second user message input includes at least a portion of one or more words in a portion of a completed message received from the second user;

selecting, in response to receipt of the second user message input from the second user in the first chat session, a first user-specific type-ahead suggestion for the second user based on both the at least a portion of one or more words in the portion of the completed message received from the second user and the context associated with the first user by applying the first user-specific type ahead domain; and presenting the first user-specific type-ahead suggestion to the first user through the first chat session if the second user accepts the first user-specific type-ahead suggestion.

16. The system of claim 15, wherein the instructions which, when executed by the one or more processors, further cause the one or more processors to perform operations comprising:

receiving first user message input from the first user to the second user in the first chat session;

presenting the first user message input from the first user to the second user in the first chat session;

receiving the second user message input from the second user in the first chat session in response to presentation of the first user message input from the first user to the second user in the first chat session; and selecting the first user-specific type-ahead suggestion based on the first user message input received from the first user, the second user message input, and the context associated with the first user using the first user-specific type-ahead domain.

17. The system of claim 15, wherein the instructions which, when executed by the one or more processors, further cause the one or more processors to perform operations comprising:

receiving a rejection of the first user-specific type-ahead suggestion from the second user in response to presenting the first user-specific type-ahead suggestion to the second user; and updating one or more user-specific type-ahead domains, including the first user-specific type-ahead domain selected for the second user, based on the rejection of the first user-specific type-ahead suggestion by the second user.

18. The system of claim 15, wherein the instructions which, when executed by the one or more processors, further cause the one or more processors to perform operations comprising:

selecting a second user-specific type-ahead domain for the first user based on the context associated with the first user;

receiving first user message input from the first user in the first chat session;

selecting a second user-specific type-ahead suggestion for the first user in response to receipt of the first user message input from the first user in the first chat session based on both the first user message input and the context associated with the first user using the second user-specific type-ahead domain selected based on the context associated with the first user; and presenting the second user-specific type-ahead suggestion to the second user in the first chat session if the first user accepts the second user-specific type-ahead suggestion.

19. The system of claim 15, wherein the instructions which, when executed by the one or more processors, further cause the one or more processors to perform operations comprising:

connecting a third user to communicate through a third user device with the second user through the second user device in a second chat session concurrently with the first user communicating with the second user in the first chat session;

selecting another user-specific type-ahead domain for the second user based on one or more characteristics associated with the third user;

receiving additional second user message input from the second user in the second chat session;

selecting another user-specific type-ahead suggestion for the second user in response to receipt of the additional second user message input from the second user in the second chat session based on both the additional second user message input and the one or more characteristics associated with the third user using the another user-specific type-ahead domain selected based on the one or more characteristics associated with the third user; and presenting the another user-specific type-ahead suggestion to the third user through the second chat session if the second user accepts the another user-specific type-ahead suggestion.

20. A non-transitory computer-readable storage medium having stored therein instructions which, when executed by a processor, cause the processor to perform operations comprising:

connecting a first entity to communicate with a second entity in a chat session;

selecting a first entity-specific type-ahead domain for the second entity based on one or more characteristics associated with the first entity as indicated by first entity message input from the first entity to the second entity received in the chat session;

receiving second entity message input from the second entity in the chat session, wherein the second entity message input includes at least a portion of one or more words in a portion of a completed message received from the second entity;

selecting, in response to receipt of the second entity message input from the second entity in the chat session, a first entity-specific type-ahead suggestion for the second entity based on both the at least a portion of one or more words in the portion of the completed message received from the second entity and the one or more characteristics associated with the first entity by applying the first entity-specific type-ahead domain; and presenting the first entity-specific type-ahead suggestion to the first entity through the chat session if the second entity accepts the first entity-specific type-ahead suggestion.

* * * * *